(12) United States Patent
Thukral

(10) Patent No.: US 7,624,153 B2
(45) Date of Patent: Nov. 24, 2009

(54) ALLOCATION OF RESOURCES TO DELIVER MEDIA CONTENT USING A COMBINATION OF STATIC AND DYNAMIC RESOURCES

(75) Inventor: Vivek Thukral, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 11/532,400

(22) Filed: Sep. 15, 2006

(65) Prior Publication Data

US 2008/0071910 A1 Mar. 20, 2008

(51) Int. Cl.
*G06F 15/16* (2006.01)

(52) U.S. Cl. .................. 709/206; 709/226; 725/114; 725/115

(58) Field of Classification Search ......... 709/224–226; 725/114–115
See application file for complete search history.

(56) References Cited

U.S. PATENT DOCUMENTS

| | | | |
|---|---|---|---|
| 4,573,072 | A | 2/1986 | Freeman |
| 5,638,112 | A | 6/1997 | Bestler et al. |
| 5,812,928 | A | 9/1998 | Watson, Jr. et al. |
| 5,848,397 | A | 12/1998 | Marsh et al. |
| 5,982,411 | A | 11/1999 | Eyer et al. |
| 6,005,597 | A | 12/1999 | Barrett et al. |
| 6,188,871 | B1 | 2/2001 | Kitamura et al. |
| 6,243,145 | B1 | 6/2001 | Schlarb et al. |
| 6,546,016 | B1 | 4/2003 | Gerszberg et al. |
| 6,557,031 | B1 | 4/2003 | Mimura et al. |
| 6,889,385 | B1 | 5/2005 | Rakib et al. |
| 6,915,531 | B2 | 7/2005 | Yun |
| 7,027,716 | B1 | 4/2006 | Boyle et al. |
| 2002/0019834 | A1 | 2/2002 | Vilcauskas, Jr. et al. |
| 2002/0046406 | A1 | 4/2002 | Chelehmal et al. |
| 2002/0107027 | A1 | 8/2002 | O'Neil |
| 2002/0108119 | A1 | 8/2002 | Mao et al. |
| 2002/0129374 | A1 | 9/2002 | Freeman et al. |
| 2002/0147978 | A1 | 10/2002 | Dolgonos et al. |
| 2002/0169540 | A1 | 11/2002 | Engstrom |

(Continued)

FOREIGN PATENT DOCUMENTS

WO        WO05111893         11/2005

(Continued)

OTHER PUBLICATIONS http://brahms.kaist.ac.kr/down/file_0PpQrG.pdf "An Efficient Channel Allocation Scheme for Multicast Traffic In Multi-Tier Cellular Systems"—Apr. 2001 IEICE TRANS Commun.*

(Continued)

*Primary Examiner*—Moustafa M Meky
*Assistant Examiner*—Randy Scott
(74) *Attorney, Agent, or Firm*—Lee & Hayes, PLLC

(57) ABSTRACT

A strategy is described for allocating resources of an operations center to provide a collection of channels. The strategy uses static resources to provide relatively popular channels and dynamic resources to provide relatively unpopular channels. The strategy can separately perform this allocation for different regions served by the operations center. Through this provision, the strategy can reduce the cost of the operations center by making more efficient use of a limited number of resources.

17 Claims, 5 Drawing Sheets

U.S. PATENT DOCUMENTS

| | | | |
|---|---|---|---|
| 2003/0065805 A1 | 4/2003 | Barnes | |
| 2003/0196211 A1 | 10/2003 | Chan | |
| 2003/0207696 A1* | 11/2003 | Willenegger et al. | 455/522 |
| 2003/0217365 A1 | 11/2003 | Caputo | |
| 2003/0220984 A1* | 11/2003 | Jones et al. | 709/219 |
| 2004/0034877 A1 | 2/2004 | Nogues | |
| 2004/0209602 A1 | 10/2004 | Joyce et al. | |
| 2005/0055721 A1 | 3/2005 | Zigmond et al. | |
| 2005/0080665 A1 | 4/2005 | Bowman-Amuah | |
| 2005/0210138 A1* | 9/2005 | Zigmond et al. | 709/227 |
| 2005/0267816 A1 | 12/2005 | Jaramillo | |
| 2005/0289623 A1 | 12/2005 | Midani et al. | |
| 2006/0015409 A1 | 1/2006 | Kato et al. | |
| 2006/0036495 A1 | 2/2006 | Aufricht et al. | |
| 2006/0064348 A1 | 3/2006 | Li | |
| 2006/0074769 A1 | 4/2006 | Looney et al. | |
| 2006/0130110 A1 | 6/2006 | Cho et al. | |
| 2006/0184990 A1 | 8/2006 | Kwak et al. | |
| 2006/0218588 A1* | 9/2006 | Kelts | 725/39 |
| 2006/0235993 A1 | 10/2006 | Gervais et al. | |
| 2007/0081537 A1 | 4/2007 | Wheelock | |
| 2007/0116048 A1* | 5/2007 | Addington | 370/468 |
| 2008/0059646 A1 | 3/2008 | Ludvig et al. | |
| 2008/0310436 A1 | 12/2008 | Bareis | |

FOREIGN PATENT DOCUMENTS

| | | |
|---|---|---|
| WO | WO2006003543 | 1/2006 |

OTHER PUBLICATIONS http://www.tnsglobal.com/_assets/files/TNS_AudienceMatters_Insert.pdf "Chin'a Multi-Tiered TV Landscape" TNS MEdia Research.*

Dan, et al., "Channel Allocation Under Batching and VCR Control in Video-on-Demand Systems," abstract of paper presented in Multimedia Processing and Technology, vol. 30, No. 2, pp. 168-179, 1995, abstract available at <<http://cat.inist.fr/?aModele=afficheN&cpsidt=2971078>>, accessed on Jun. 21, 2006, 2 pages.

Dan, et al., "Scheduling Policies for an On-Demand Video Server with Batching," Multimedia '94, 1994, available at <<http://delivery.acm.org/10.1145/200000/192614/p15-dan.pdf?key1=192614&key2=7437490511&coll=Portal&dl=GUIDE&CFID=74220359&CFTOKEN=92790055>>, pp. 15-23.

Tseng, et al., "Seamless Channel Transition for the Staircase Video Broadcasting Scheme," IEEE/ACM Transactions on Networking, vol. 12, No. 3, Jun. 2004, pp. 559-571.

Aalto, et al., "Bluetooth and WAP Push Based Location-Aware Mobile Advertising System," MobiSYS '04, Jun. 6-9, 2004, Boston, Massachusetts, ACM Document No. 1-58113-793-1/04/00006, 2004, accessible at <<http://www.mediateam.oulu.fi/publications/pdf/496.pdf>>, 10 pages.

"Arris to Demonstrate Wideband Data and IPTV at NCTA," PR Newswire, available at <<http:www.commsdesign.com/press_releases/prnewswire/showPressRelease.jhtml?HeadlineId=X310468&CompanyID=1>>, Apr. 1, 2005, 3 pages.

"Cable operators revamp video services," FierceIPTV, Jun. 15, 2006, available at <<http://www.fierceiptv.com/node/956>, 3 pages.

Chehimi, et al., "Delivering 3D Advertising to Mobile Phones," Consumer Electronics, 2006. ICCE '06, Jan. 7-11, 2006, pp. 455-456.

"Enterprise Solution IPTV," ADTEC Digital, Nashville, Tennessee, available at <<http://www.adtecinc.com/documentcenter/brochures/iptv%20brochure.pdf>>, accessed on Jun. 29, 2006, 2 pages.

Hinze, et al., "Location- and Time-Based Information Delivery in Tourism," Lecture Notes in Computer Science, Springer Berlin, Heidelberg, vol. 2750/2003, 2003, abstract available at <<http://www.springerlink.com/(fuklby45eg0g4tq2c1tqmw45)/app/home/contribution.asp?ref . . . >>, abstract printed on May 4, 2006, 2 pages.

"MSOs Get serious About IPTV," Dark Reading Security Insider, Jun. 12, 2006, available at <<http://www.darkreading.com/document.asp?doc_id=97222&WT.svl=wire_8>>, accessed on Jun. 29, 2006, pp. 1-5.

"OpenTV IPTV Solutions", OpenTv, Inc., San Francisco, Sep. 2005, available at <<http://www.opentv.com/files/OpenTv_IPTV_Whitepaper.pdf>>, 21 pages.

Cable Labs, "Open Cable Specifications, Open Cable Undirectional Receiver, OC_SP_OCUR_104_060622", located at http://www.opencable.com/downloads/specs/OC-SP-OCUR-104-060622.pdf, Jun. 22, 2006, 48 pgs.

Sakthi, "Open Cable Set-Top Box", located at http://www.wipo.com/pdf_files/Opem_cable_set_top_box.pdf, 2005, 12 pgs.

* cited by examiner

| CATEGORY | EXEMPLARY BACKEND ALLOCATION | EXEMPLARY FRONT-END ALLOCATION |
|---|---|---|
| MOST POPULAR | STATIC | STATIC |
| . . . | . . . | . . . |
| MODERATELY POPULAR | STATIC | DYNAMIC |
| LEAST POPULAR | DYNAMIC | DYNAMIC |

FIG. 2

content continues …

ALLOCATION OF RESOURCES TO DELIVER MEDIA CONTENT USING A COMBINATION OF STATIC AND DYNAMIC RESOURCES

BACKGROUND

IP-based WANs are becoming an increasingly feasible mechanism for delivering media resources to users. Such media resources can include movies, music, and so forth. IP-based media delivery services can potentially offer functionality that is more flexible and interactive compared to traditional cable-based solutions. Further, IP-based media delivery services can potentially offer many more channels compared to traditional cable-based solutions.

However, IP-based media delivery services may also present new technical and business-related challenges. For instance, a service may wish to offer a large number of channels to entice users to subscribe to the service. The service may increase its channel offerings by proportionally increasing the number of resources dedicated to providing respective channels. Yet the cost of a service also proportionally increases with the addition of new server resources. It may therefore be an expensive proposition to provide a large number of channels.

For at least the above-identified reasons, there is a need for more satisfactory approaches to delivering media items to users.

SUMMARY

A strategy is described for allocating resources of an operations center to provide a collection of channels. The strategy uses static resources to provide relatively popular channels and dynamic resources to provide relatively unpopular channels. The strategy can separately perform this allocation for different regions served by the operations center. Through this provision, the strategy can reduce the cost of delivering media content by making more efficient use of a limited number of resources, while still providing a relatively large number of channels.

In another exemplary implementation, the operations center includes plural tiers, including a backend tier associated with acquisition functionality and a front-end tier associated with delivery functionality. The acquisition functionality receives and performs preliminary processing on media content. The delivery functionality facilitates the transfer of the media content to client devices, such as by bursting the media content to the client devices upon channel tune events. In this environment, the strategy can separately perform resource allocation for each tier. For example, the strategy can provide: a first group of highly popular channels using a combination of static backend resources and static front-end resources; a second group of moderately popular channels using a combination of static backend resources and dynamic front-end resources; and a third group of relatively unpopular channels using a combination of dynamic backend resources and dynamic front-end resources.

Additional exemplary implementations and attendant benefits are described in the following.

BRIEF DESCRIPTION OF THE DRAWINGS

FIG. 2 shows a table that identifies one exemplary strategy for allocating static and dynamic resources to channels based on the popularity of the channels.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for delivering media content to users over a set of channels using a collection of static resources and a collection of dynamic resources. The static resources are used to provide relatively popular channels in a dedicated manner. The dynamic resources are used to provide less popular channels on an on-demand basis (e.g., only when users request such channels).

The term "media content" as used herein has broad connotation. Media content can refer to video content, audio content, still image content, program-related content (e.g., game-related content), and so forth, or any combination thereof. For example, media content can correspond to television programs, movies, music, and so forth. The term "media item" refers to a particular instance of media content, such as a particular television program, movie, song, and so forth.

The term "channel" refers to any provision for delivering media content. As will be described, in an IP-based media delivery solution, a channel may be associated with a network-accessible address through which a client device may receive media content.

This disclosure includes the following sections. Section A describes an exemplary system for delivering media content to client devices. Section B describes an exemplary procedure that explains the operation of the system of Section A.

A. Exemplary Systems

As a preliminary note, any of the functions described with reference to the figures can be implemented using software, firmware, hardware (e.g., fixed logic circuitry), manual processing, or a combination of these implementations. The term "logic, "module," "system" or "functionality" as used herein generally represents software, firmware, hardware, or a combination of the elements. For instance, in the case of a software implementation, the term "logic," "module," "system," or "functionality" represents program code that performs specified tasks when executed on a processing device or devices (e.g., CPU or CPUs). The program code can be stored in one or more computer readable memory devices.

More generally, the illustrated separation of logic, modules, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, systems, and functionality can be located at a single site (e.g., as implemented by a processing device), or can be distributed over plural locations.

Figure 1:
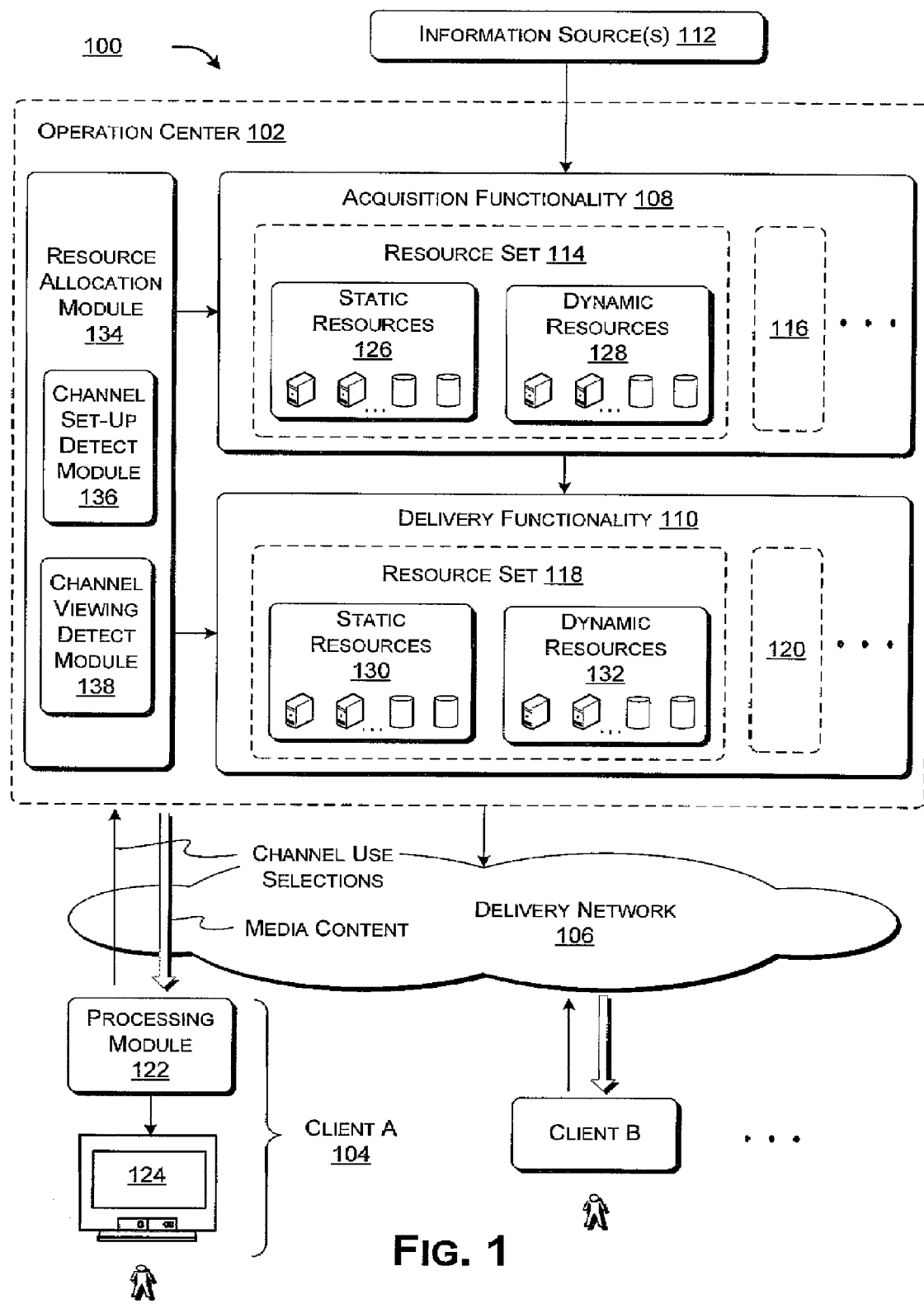
FIG. 1 shows an exemplary multi-tiered system for delivering media items to users, employing a collection of static resources and dynamic resources.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

A.1. System Overview FIG. 1 shows an exemplary system 100 for delivering media content to users. The system 100 includes an operations center 102 that supplies the media content to a plurality of client devices (such as representative client device 104) via delivery network 106. The system 100 will be described in generally top-down fashion.

The operations center 102 includes multiple tiers, including a backend tier that provides acquisition functionality 108 and a front-end tier that provides delivery functionality 110. The purpose of the acquisition functionality 108 is to receive media content from information sources 112, and to optionally perform preliminary processing on the media content. The purpose of the delivery functionality 110 is to perform various services in connection with the delivery of the media content to the representative client device 104. Although only two tiers in the delivery infrastructure are shown, the operations center 102 can include additional tiers for performing other roles associated with the processing and delivery of media items. Further, note that FIG. 1 shows the various components of the operations center 102 as being co-located at a single site. However, the operations center 102 can also be distributed over plural sites, where such sites can be administered by a single entity or plural different entities.

Starting with the acquisition functionality 108, this functionality 108 can receive media content from various information sources 112 using any transfer technique. In one technique, the acquisition functionality 108 can receive the media content by a streaming mode of transfer. In another technique, the acquisition functionality 108 can receive the media content by a bulk file mode of transfer. In another technique, the acquisition functionality 108 can receive the media content by manual transfer of computer readable media, and so on. The information sources 112 can represent cable sources, satellite sources, terrestrial antenna broadcast sources, Internet-based sources, other network sources, and so forth.

The acquisition functionality 108 can perform various preliminary processing on the received media content. Such preliminary processing can involve converting the media content into a format suitable for delivery to the client device 104. The preliminary processing can also involve applying various types of rights management protection to the media content (e.g., to prevent unauthorized consumption of the media content).

In one particular mode of delivery, the acquisition functionality 108 uses a multicasting technique to deliver media content. One such multicasting technique is the Internet Group Management Protocol (IGMP)). In a multicasting technique, the acquisition functionality 108 can provide a tree of distribution nodes for delivering a media item from an ultimate source. A client device can "tune" to receive this media item by "taping into" an appropriate node in the distribution tree. Here, the terms "channel" and "tune" are virtual counterparts to physical channels and tune events associated with a conventional broadcast or cable environment. More specifically, in an IP environment, a channel is associated with an address through which a client device may receive media content, rather than a prescribed segment of a physical frequency spectrum. In an IP environment, a client device "tunes" to receive this media content by connecting to an appropriate address, rather than adjusting a physical tuner to receive a signal being broadcast over a prescribed frequency segment.

In terms of physical implementation, the acquisition functionality 108 can comprise various resource sets, such as resource set 114, resource set 116, and so on. Each resource set may comprise a collection of functionality used to acquire and process media content received from the information sources 112. More specifically, in one exemplary implementation, different resource sets may serve different respective geographic regions. For example, one or more resource sets may serve a group of users located in the California San Francisco bay area, while one or more other resources sets may serve a group of users located in the Seattle area, and so on. Each resource set can include various equipment, such as one or more servers, one or more data storage units, various network-related resources, and so forth. The network-related resources can comprise various communication links, routing mechanisms, interfaces, and so on.

Turning now to the delivery functionality 110, this functionality 110 can facilitate the transfer of media content to the client device 104. Different systems may use the delivery functionality 110 in different ways. One exemplary system may use the delivery functionality 110 to transmit media content in unicast fashion. In a unicast mode of transmission, the delivery functionality 110 provides a dedicated stream of media content (provided by dedicated server resources) to a single client device. Alternatively, the operations center 102 can deliver the media content to the client devices in multicast fashion. As stated above, in the multicast mode of transmission, the operations center 102 can provide the media content through a tree of distribution nodes. In either the unicast mode or transmission or the multicast mode of transmission, the acquisition functionality 108 can act as the ultimate source of the media content. For instance, in the unicast mode, the delivery functionality 110 can serve as an intermediary, that is by acting as a multicast recipient with respect to the media content provided by the acquisition functionality 108, and by acting as a unicast provider with respect to a downstream client device.

In another implementation, the delivery functionality 110 can deliver media content using a combination of unicast communication and multicast communication. For example, the delivery functionality 110 can deliver a media item to the client device 104 in unicast fashion when the client device 104 first tunes to a particular channel. To facilitate quick acquisition of the content, the delivery functionality 100 can provide this unicast stream at a burst rate (which is greater than the nominal or steady state rate of the stream). After a predetermined period of time, the client device 104 can transition from the unicast stream to an established multicast stream (where both unicast stream and multicast stream pertain to the same media content). Co-pending and commonly assigned U.S. patent application Ser. No. 10/010,200 (the '200 Application), entitled, "ACCELERATED CHANNEL CHANGE IN RATE-LIMITED ENVIRONMENTS," naming the inventors of Geoffrey R. Smith et al., filed on Dec. 10, 2004, provides further exemplary details regarding one protocol for delivering media content using a combination of unicast and multicast techniques. The '200 Application is incorporated by reference herein in its entirety.

The delivery functionality 110 can also perform a role in receiving retry requests from the client device 104 and sending retry packets to the client device 104 in response to these requests. Co-pending and commonly assigned U.S. patent application Ser. No. 11/012,891 (the '891 Application), entitled, "RETRY STRATEGIES FOR USE IN A STREAMING ENVIRONMENT," naming the inventors of Dustin L. Green et al., filed on Dec. 15, 2004, provides further exemplary details regarding one exemplary protocol for performing retry operations in a media distribution system. The '891 Application is incorporated by reference herein in its entirety.

In terms of physical implementation, the delivery functionality 110 can comprise various resource sets, such as resource set 118, resource set 120, and so on. Each resource set may comprise a collection of functionality used to perform any combination of the delivery-related roles described above. In one exemplary implementation, different resource sets may serve different respective geographic regions. For example, one or more resource sets may serve a group of users located in the Milpitas area of California, while one or more other resources sets may serve a group of users located in the neighboring San Jose area, and so on. Each resource set can include various equipment, such as one or more servers, one or more data storage units, various network-related resources, and so forth. The network-related resources can comprise various communication links, routing mechanisms, interfaces, and so on.

The delivery network 106 couples the operations center 102 to the client devices, such as representative client device 104. This delivery network 106 can be implemented in different ways to suit different technical and commercial environments. For instance, the delivery network 106 can include any kind of network (or combination of networks), such as a wide area network (e.g., the Internet), an intranet, Digital Subscriber Line (DSL) network infrastructure, point-to-point coupling infrastructure, and so on. The delivery network 106 can use or involve any kind of protocol or combination of protocols. In the case where one or more digital networks are used to disseminate information, the delivery network 106 can include various hardwired and/or wireless links, routers, gateways, name servers, and so on. In the case where DSL infrastructure is used to disseminate information, the delivery network 106 can utilize the services, in part, of telephone coupling infrastructure and DSL processing functionality.

The delivery network 106 can provide a downstream path (e.g., for providing media content and other data to the client device 104) and an upstream path (e.g., for returning tune selections and other data to the operations center 102). In an IP-based solution, the same physical mechanism can be used to implement the downstream path and the uplink path. But it is also possible to implement these two paths using different communication mechanisms and/or protocols.

Whatever delivery strategy is used, the operations center 102 can deliver media content to the client device 104 using a variety of packaging paradigms. In one case, the operations center 102 can supply a sequence of programs to users in different channels. In this mode, the operations center 102 can present the programs according to a fixed schedule, in the manner of traditional delivery of channels (although the channels do not have the frequency-specific connotation of traditional analog systems which use physical tuners). In a VOD-related case, the operations center 102 can deliver individual media programs to a user whenever the user requests the programs. Still other program packaging paradigms are possible. As used herein, the term "channel" is intended as a general concept, referring to a vehicle for delivering a series of programs according to defined schedule, or to a vehicle for delivering individual media items on an on-demand basis.

The media content itself can be expressed in any format, including, but not limited to, the MPEG-2 standard, Microsoft Corporation's VC-1 standard, the ISO/ITU H.264 standard, and so forth. The coded media content can be encapsulated into packets using any format, including, but not limited to, the Real Time Transport Protocol (RTP), the Real Time Streaming Protocol (RTSP), the Advanced Streaming Format (ASF), and so forth.

Now addressing the client-side aspects of the system 100, the representative client device 104 can be can be implemented in different ways. The client device 104 can represent a set-top box, a television set with integral IP interfacing/processing functionality, a digital video recorder (DVR) device, a rewritable digital video disc (DVD-RW) device, a personal computer having AV decoding functionality, and so forth (as well as any combination of these devices). Or the client device 104 can take the form of a mobile telephone, a personal digital assistant (PDA), tablet-type computer device, any kind of wearable computer (e.g., a wristwatch-type computer device), a game console, and so forth.

In whatever manner the client device 104 is implemented, this device can comprise a processing module 122 that is communicatively coupled to a presentation module 124. The processing module 122 corresponds to functionality for processing the media content, and the presentation module 124 corresponds to functionality for presenting the output of the presentation module 122. The processing module 122 and the presentation module 124 can be integrated together, or coupled together via a communication conduit (e.g., a communication cable).

As mentioned above, the client device 104 can select a channel by generating a tuning event. The tuning event enables the client device 104 to connect to a unicast or multicast stream that provides the desired media content. Tuning does not imply locally adjusting a bandwidth filter to select a desired signal being broadcast over a prescribed frequency. Co-pending and commonly assigned U.S. patent application Ser. No. 11/057,477 (the '477 Application), entitled, "TUNERLESS MEDIA PRESENTATION UNIT AND METHODS OF USE," naming inventors David L. de Heer et al., filed on Feb. 14, 2005, provides further exemplary details regarding one exemplary implementation of a client device. The '477 Application is incorporated by reference herein in its entirety.

With the above overview of the exemplary system 100, attention is now directed to a strategy for allocating resources for delivering channels to users.

A.2. Allocation of Resources Within the Operations Center

FIG. 1 shows that the operations center 102 includes a collection of static resources and a collection of dynamic resources. A static resource corresponds to a resource that is dedicated to providing one or more channels. In other words, a static resource for delivering a particular channel is a resource that is already set up to provide this channel when a client device asks for it. A dynamic resource corresponds to a resource that is not dedicated beforehand to one or more channels. In other words, a dynamic resource for delivering a particular channel is a resource that must be set up in an on-demand fashion when a client asks for it. A static resource can deliver media content with lower latency compared to a dynamic resource. This is because the static resource is already set up to deliver the content, whereas a finite amount of configuration time may be involved in setting the dynamic resource up to provide the channel.

More specifically, each tier of the operations center 102 can include a collection of static resources and a collection of dynamic resources. For example, the acquisition functionality 108 includes various resource sets (114, 116, ... ), wherein each set can include static resources and dynamic resources. For example, resource set 114 includes static resources 126 and dynamic resources 128. The static resources 126 can include various pre-assigned servers, data stores, network equipment, etc. for receiving and processing media items. These static resources 126 serve a first group of channels. The dynamic resources 128 may include various on-demand (e.g., not pre-assigned) servers, data stores, network equipment, etc. for acquiring and processing media items. These dynamic resources 128 serve a second group of channels. In the case of the dynamic resources 128, when a channel is no longer being requested by any client device, the dynamic resource(s) that were used to provide that channel can be freed up to acquire and process other channels.

Similarly, the delivery functionality 110 includes various resource sets (118, 120, . . . ), wherein each resource set can include static resources and dynamic resources. For example, resource set 118 can include static resources 130 and dynamic resources 132. The static resources 130 may include various pre-assigned servers, data stores, network equipment, etc. for providing fast tune services (discussed above) and other special services for a first group of channels. The dynamic resources 132 may include various on-demand (not pre-assigned) servers, data stores, network equipment, etc. that can be assigned to provide fast tune services and other special services for a second group of channels. In the case of the dynamic resources 132, when a channel is no longer being requested by any client device, the dynamic resource(s) that were used to provide that channel can be freed up to process other channels.

A resource allocation module 134 governs the assignment of static resources and dynamic resources in the various tiers of the operations center 102 to different groups of channels. The basic goal of the resource allocation module 134 is to assign static resources to channels that are likely to be frequently requested in other words, channels that are likely to be popular among users. The resource—in allocation module 134 can assign dynamic resources to channels that are likely to be less frequently requested—in other words, channels that are likely to be less popular among users. To perform this function, the resource allocation module determines its assignments based on channel use data.

The above-described approach has numerous benefits. According to one benefit, the approach allows the operations center 102 to offer a relatively large number of channels, such as, but not limited to, 1000 or more channels. However, the operations center 102 need not devote dedicated resources to implementing each of these channels. Rather, the service can devote dedicated resources to implementing the n most popular channels, while providing the remainder of the channels on an on-demand basis. (More specifically, as will be discussed in greater detail below, the operations center 102 can devote separate analysis for its different tiers to determine how to allocate static and dynamic resources within each tier). This feature is advantageous because it helps reduce the cost of the service, while, at the same, time, providing a rich library of media content over many channels.

The resource allocation module 134 can assess popularity based on different kinds of channel use data. In a first case, a channel set-up detection module 136 can assess popularity by determining a number of users who have requested a certain channels in respective preliminary set-up procedures. For example, in a set-up procedure, a user can expressly inform the operations center 102 that he or she often watches channels W, X, Y, and Z. In a second case, a channel viewing detection module 138 can assess popularity by determining a number of users who have accessed certain channels during one or more viewing sessions. For example, a user can indirectly inform the operations center 102 that he or she often watches channels W, X, Y, and Z by virtue of the fact that the user often tunes to receive these channels. Based on both types of channel use data, the resource allocation module 134 can selectively devote static resources in one or more tiers to provide the channels that users are expected to frequently watch in the future. The resource allocation module 134 can devote dynamic resources in or one more tiers to less popular channels.

As stated above, the resource allocation module 134 can perform the above-described analysis for different resource sets. Different resource sets, in turn, may be associated with different geographic regions. For instance, the resource allocation module 134 may collect channel use data for viewers in the San Francisco area, and based thereon, allocate an appropriate collection of static and dynamic resources to deliver channels in that area. The resource allocation module 134 can also collect channel use data for viewers in the Seattle area, and based thereon, allocate a different grouping of static and dynamic resources to deliver channels in that area. A channel that is popular in one region may also be popular in another region, but this may not always be true, due to any combination of demographic factors and/or other factors.

Advancing to FIG. 2, this figure shows a resource allocation table. The table defines, without limitation, one strategy for assigning resources within different tiers of the operations center 102 based on popularity data. The so-called backend resources identified in the table refer to resources used in the acquisition functionality 108. The so-called front-end resources identified in the table refer to resources used in the delivery functionality 110.

The table shows that the allocation module 134 can define different popularity categories for different respective ranges of popularity. The allocation module 134 can assign a particular channel to an appropriate popularity category if its popularity level (reflected by the collected popularity data) falls within a range associated with the popularity category. The allocation module 134 can then allocate resources within a tier based on the popularity category assigned to the channel. Different tables may potentially apply to different resources sets, possibly associated with different respective geographic areas.

A first popularity category is "most popular." This category describes a highest level of popularity exhibited by the channel use data. For this category, both the acquisition functionality 108 and the delivery functionality 110 use static resources to provide "most popular" channels. The full allocation of static resources ensures that the client device 104 can tune to one of the "most popular" channels with a relatively small amount of latency. The latency is small because resources have already been configured to deliver the selected channel.

A second popularity category is "moderately popular." This category describes a next-highest level of popularity exhibited by the channel use data. To provide "moderately popular" channels, the acquisition functionality 108 uses static resources, while the delivery functionality 110 uses dynamic resources. The partial allocation of static resources allows the client device. 104 to tune to one of the "moderately popular" channels with an amount of latency that is less than the "most popular" category.

A third popularity category is "least popular." This category describes a lowest level of popularity exhibited by the channel use data. For this category, both the acquisition functionality 108 and the delivery functionality 110 use dynamic resources to provide "least popular" channels. The fall allocation of dynamic resources likely imposes the greatest amount of tune latency. The latency is relatively large because resources must be configured to deliver a selected channel when the user tunes to it, which takes a finite amount of time.

The table of FIG. 2 shows three exemplary categories of popularity. But other implementations may apply additional levels of popularity, having associated allocations of static and dynamic resources.

Figure 3:
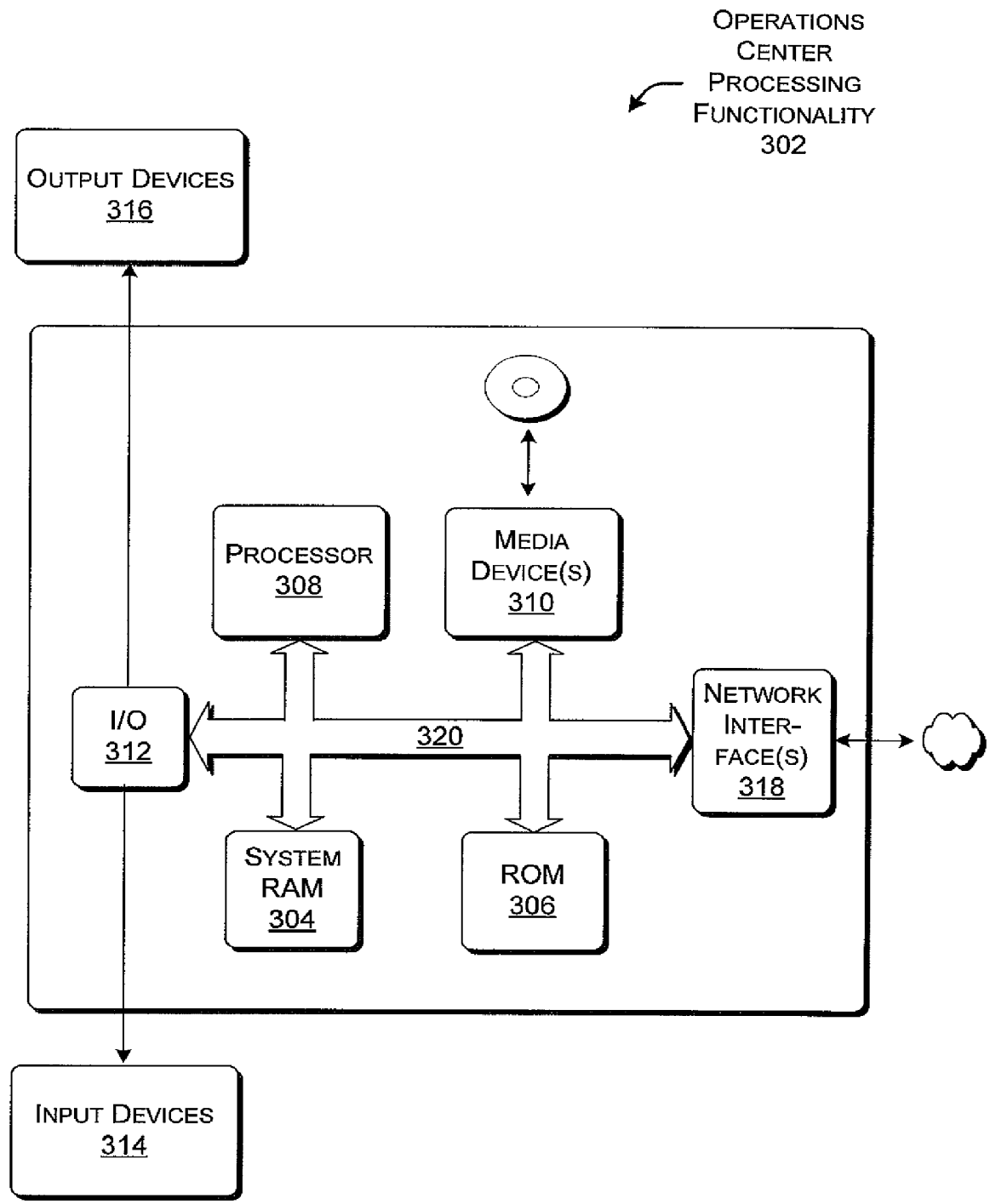
FIG. 3 shows exemplary processing functionality for implementing any aspect of an operations center shown in FIG. 1.

A.3. Exemplary Functionality for Implementing Any Aspect of the Operations Center FIG. 3 sets forth exemplary processing functionality 302 that can be used to implement any aspect of the operations center 102 of FIG. 1. For example, any resource provided by the operations center 102 can be implemented, in part, by one or more server-type computers. FIG. 3 describes the exemplary composition of such a server-type computer. In general, the processing functionality 302 can be located at a single head-end site and/or spread over plural sites.

The processing functionality 302 can include various volatile and non-volatile memory, such as RAM 304 and ROM 306, as well as one or more central processing units (CPUs) 308. The processing functionality 302 can perform various operations identified above when the CPU 308 executes instructions that are maintained by memory (304, 306). The processing functionality 302 also optionally includes various media devices 310, such as a hard disk module, an optical disk module, and so forth.

The processing functionality 302 also includes an input/output module 312 for receiving various inputs from the user (via input devices 314), and for providing various outputs to the user (via output devices 316). The processing functionality 302 can also include one or more network interfaces 318 for exchanging data with other devices via one or more communication conduits (e.g., networks). One or more communication buses 320 communicatively couple the above-described components together.

A.4. Exemplary Functionality for Implementing a Client Device

Figure 4:
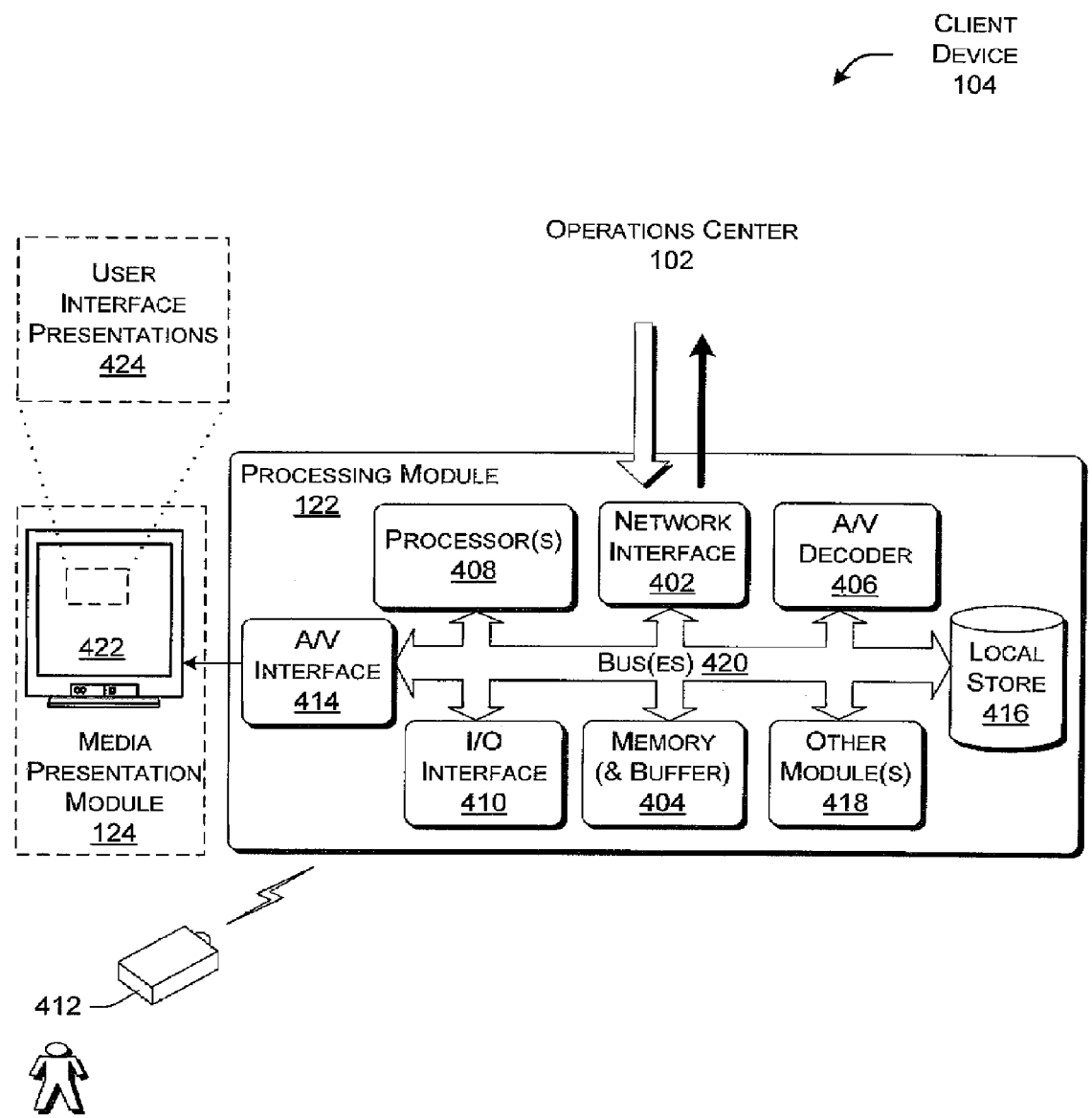
FIG. 4 shows exemplary processing functionality for implementing any aspect of a client device shown in FIG. 1.

FIG. 4 provides additional details regarding the representative client device 104 (introduced in the context of FIG. 1). To review, the client device 104 comprises the above-identified processing module 122 coupled to the presentation module 124.

The processing module 122 can include a number of modules for performing its ascribed tasks. To begin with, the processing module 122 includes a network interface module 402. The network interface module 402 can represent any functionality for receiving media content from the operations center 102 using any coupling mechanism. For example, the network interface module 402 can comprise an Ethernet NIC, a DSL modem, a cable modem, a wireless network interface, or other kind of network interface equipment. The processing module 122 also includes memory 404. The processing module 122 also includes an audio-visual (AV) decoder 406 for decoding (and decompressing) the received media content. The processing module 122 also includes one or more processors 408 for executing instructions to implement the functionality of the processing module 122. The processing module 122 also includes an I/O interface 410 for interacting with the user via one or more input devices, such as a remote controller 412. The processing module 122 also includes an A/V interface module 414 for providing media content in an appropriate format to the presentation module 124. The processing module 122 also includes a local store 416 for storing recorded programs and other data. Finally, the client processing module 418 can include various other modules 418, not specifically identified by name in the figure. For instance, the client processing module 122 can include a graphics compositor for combining a video component of the media content from the AV decoder 406 on a frame-by-frame basis with graphics information. The graphics information may comprise various user interface presentations which are overlaid on the media content. One or more busses 420 communicatively couple the above-identified components together.

The presentation module 124 can comprise any kind of device for presenting AV information, including a CRT-type device, an LCD-type device, and so forth. In any case, the presentation module 124 defines a display surface 422. The processing module 122 can present one or more user interface presentations 424 on the display surface 422.

B. Exemplary Procedures

Figure 5:
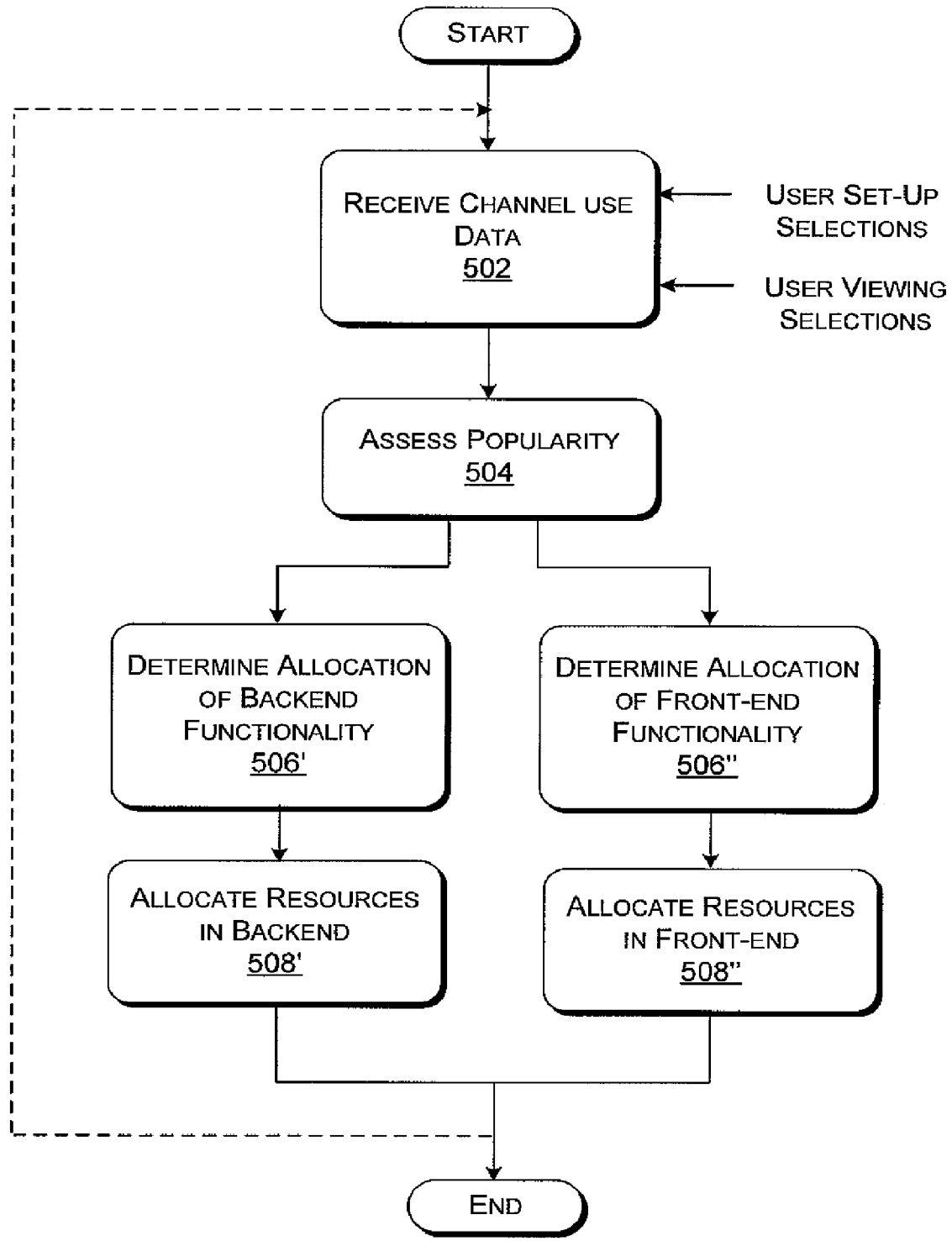
FIG. 5 shows an exemplary procedure that explains one manner of operation of the system of FIG. 1.

FIG. 5 shows a procedure 500 which explains the operation of the system 100 in flow chart form. To facilitate discussion, certain operations are described as constituting distinct blocks performed in a certain order. Such implementations are exemplary and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

As the functions described in the flowcharts have already been set forth in Section A, Section B serves principally as a review of those functions.

In block 502, the allocation module 134 receives channel use data. Channel use data can identify channels selected by users in respective channel set-up procedures. Channel use data can identify channels selected by users in the course of user viewing sessions.

In block 504, based on the channel use data collected in block 502, the allocation module 134 can assign popularity categories to a plurality of channels e.g., most popular, moderately popular, least popular, etc. Addition categories can be provided.

In block 506', the allocation module 134 determines an allocation of backend (acquisition functionality 114) resources based on the popularity categories determined in block 504. In block 506", the allocation module 134 determines an allocation of front-end (delivery functionality 118) resources based on the popularity categories determined in block 504.

In block 508', the acquisition functionality 108 assigns static and dynamic resources based on the results of block 506'. In block 508", the delivery functionality 110 assigns static and dynamic resources based on the results of block 506".

The dashed line indicates that the procedure 500 shown in FIG. 5 can be periodically repeated to account for shifts in channel popularity (or based on some other triggering event).

In closing, a number of features were described herein by first identifying exemplary problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for allocating resources for delivering media content using a multi-tiered delivery infrastructure, comprising:
   receiving channel use data associated with usage of identified channels; and
   allocating, based on the received channel use data, the identified channels into a plurality of groups of channels that are provided to a client via one or more resources from a group of resources, the group of resources including first-tier static resources; first-tier dynamic resources; second-tier static resources; and second-tier dynamic resources, the plurality of groups of channels including:
      a first group of channels that is provided using a combination of the static first-tier resources and the static second-tier resources;
      a second group of channels that is provided using a combination of the static first-tier resources and the dynamic second-tier resources; and
      a third group of channels that is provided using a combination of the dynamic first-tier resources and the dynamic second-tier resources,
   wherein the first-tier resources are used to acquire media content and prepare the media content for delivery, and wherein the second-tier resources are used to deliver the media content to users.

2. The method of claim 1, wherein the received channel use data comprises channel set-up information specified by at least one user, wherein the channel set-up information identifies whether said at least one user has requested the identified channel in a set-up procedure.

3. The method of claim 1, wherein the received channel use data comprises channel viewing information specified by at least one user, wherein the channel viewing information identifies whether the identified channel has been selected by said at least one user during one or more viewing sessions.

4. The method of claim 1, wherein the first-tier resources and the second-tier resources comprise one or more of: server resources; data storage resources; or network resources.

5. The method of claim 1, wherein the received channel use data comprises popularity data, and wherein the popularity data reflects a popularity of each of the identified channels.

6. The method of claim 5, further comprising determining a popularity category associated with the popularity data, wherein the allocating is performed based on the determined popularity category.

7. The method of claim 6, wherein popularity category is selected from among the categories of at least: a most popular category; a moderately popular category; and a least popular category.

8. The method of claim 7, wherein the first group of channels include channels that falls within the most popular category, the second group includes channels that all within the moderately popular category, and the third group includes channels that fall within the least popular category.

9. The method of claim 1, wherein at least one of the identified channels is used to deliver a sequence of different media items according to a defined presentation schedule.

10. The method of claim 1, wherein at least one of the identified channel is used to deliver an on-demand media item.

11. The method of claim 1, wherein the receiving and allocating are separately performed for different groups of users associated with different respective geographic regions.

12. A method for allocating resources for delivering media content using a multi-tiered delivery infrastructure, comprising:
   receiving popularity data associated with usage of an identified channel; and
   allocating, based on the received popularity data, one or more resources for use in providing the identified channel, selected from any combination of at least: first-tier static resources; first-tier dynamic resources; second-tier static resources; and second-tier dynamic resources,
   wherein the first-tier resources are used to acquire media content and prepare the media content for delivery,
   wherein the second-tier resources are used to deliver the media content to users,
   wherein the first-tier resources and the second-tier resources comprise one or more of: server resources; data storage resources; or network resources,
   further comprising performing the receiving and allocating with respect to a plurality of identified channels, to provide:
      a first group of channels that is provided using a combination of the static first-tier resources and the static second-tier resources;
      a second group of channels that is provided using a combination of the static first-tier resources and the dynamic second-tier resources; and
      a third group of channels that is provided using a combination of the dynamic first-tier resources and the dynamic second-tier resources, and
   wherein the receiving and allocating are separately performed for different geographically-based groups of users.

13. A method for allocating resources for delivering media content using a multi-tiered delivery infrastructure, comprising:
   receiving channel use data associated with usage of an identified channel, the received channel use data includes channel viewing information specified by at least one user, wherein the channel viewing information identifies whether the identified channel has been selected by said at least one user during one or more viewing sessions; and
   allocating, based on the received channel use data, one or more resources for use in providing the identified channel, selected from any combination of at least: first-tier static resources; first-tier dynamic resources; second-tier static resources; and second-tier dynamic resources,
   wherein the first-tier resources are used to acquire media content and prepare the media content for delivery, and wherein the second-tier resources are used to deliver the media content to users.

14. The method of claim 13, wherein the first-tier resources and the second-tier resources comprise one or more of: server resources; data storage resources; or network resources.

15. The method of claim 13, wherein the identified channel is used to deliver a sequence of different media items according to a defined presentation schedule.

16. The method of claim 13, wherein the identified channel is used to deliver an on-demand media item.

17. The method of claim 13, wherein the receiving and allocating are separately performed for different groups of users associated with different respective geographic regions.

* * * * *